US006883405B2

(12) United States Patent
Strauch

(10) Patent No.: US 6,883,405 B2
(45) Date of Patent: Apr. 26, 2005

(54) HAND TOOL, IN PARTICULAR, A SCREWDRIVER

(75) Inventor: Martin Strauch, Wuppertal (DE)

(73) Assignee: Wera Werk Hermann Werner GmbH & Co. KG, Wuppertal (DE)

( * ) Notice: Subject to any disclaimer, the term of this patent is extended or adjusted under 35 U.S.C. 154(b) by 0 days.

(21) Appl. No.: 10/168,209

(22) PCT Filed: Dec. 8, 2000

(86) PCT No.: PCT/EP00/12430

§ 371 (c)(1), (2), (4) Date: Oct. 22, 2002

(87) PCT Pub. No.: WO01/43922

PCT Pub. Date: Jun. 21, 2001

(65) Prior Publication Data

US 2003/0196527 A1 Oct. 23, 2003

(30) Foreign Application Priority Data

Dec. 15, 1999 (DE) ........................................ 199 60 657
Oct. 26, 2000 (DE) ........................................ 100 53 078

(51) Int. Cl.[7] ........................ B23K 26/00; B23K 15/00; B25B 15/00

(52) U.S. Cl. ............... 81/436; 219/121.66; 219/121.17; 76/119

(58) Field of Search .......................... 81/436, 438, 439, 81/460; 219/121.14, 121.17, 121.6, 121.64, 121.65, 121.66, 121.36; 76/101.1, 119; 148/525; 72/47, 56

(56) References Cited

U.S. PATENT DOCUMENTS

| | | | | |
|---|---|---|---|---|
| 3,903,761 A | * | 9/1975 | Runton | 76/119 |
| 5,953,969 A | * | 9/1999 | Rosenhan | 81/436 |
| 6,209,197 B1 | * | 4/2001 | Mori et al. | 29/888.43 |
| 6,524,036 B1 | * | 2/2003 | Kolker | 409/131 |

FOREIGN PATENT DOCUMENTS

| | | |
|---|---|---|
| DE | 4029734 | 3/1992 |
| DE | 9400780 | 3/1994 |
| DE | 19509497 | 7/1996 |
| DE | 19724319 | 10/1998 |
| DE | 19720139 | 3/1999 |
| EP | 0521256 | 1/1993 |
| GB | 950544 | 2/1964 |

* cited by examiner

*Primary Examiner*—Hadi Shakeri
(74) *Attorney, Agent, or Firm*—Martin A. Farber

(57) ABSTRACT

A process for profiling a workpiece engagement surface of a band tool, and a hand tool produced thereby, in particular a screwing tool, such as a screwdriver or wrench, pliers, a clamping tool or a file, comprising the steps of briefly irradiating the workpiece engagement surface (8) over a large area and/or locally with a high level of energy, such that a region of an irradiated zone which is close to the surface melts and solidifies suddenly at an edge to form a rib.

6 Claims, 7 Drawing Sheets

HAND TOOL, IN PARTICULAR, A SCREWDRIVER

FIELD AND BACKGROUND OF THE INVENTION

The invention relates to a hand tool, in particular a screwing tool and preferably a screwdriver or a wrench, and also pliers, a clamping tool or alternatively a file, having a recess profiled working face.

The invention also relates to a process for profiling working faces on tools of the type described above.

German utility model DE 94 00 780.2 U1 has disclosed a tool of the generic type. The utility model describes a screwdriver bit for crosshead screws, in which the working faces are profiled in linear form, with alternating recesses and elevations being formed. A channel profile with ribs flanking the channel is formed. During production of a screwdriver bit of this type, first of all the ribs are stamped. Then, the tool is hardened. The influences on the surface during hardening also act on the ribs. In the case of an excessively brittle tool, in which hard ribs project out of a hard base body, an excessive notch effect is produced. This can only be avoided by setting a lower surface hardness. However, this leads to relatively soft ribs which can then also rapidly become worn. In this context, one is faced with the problem that, on the one hand, a wear-resistant rib entails excessive brittleness of the tool, while, on the other hand, avoiding the brittleness of the tool as a whole leads to soft ribs, which therefore become worn.

Therefore, the prior art also uses other methods in order to increase the surface roughness of screwdriver bits. For example, DE 40 29 734 A1 and EP 0 521 256 A2 show the coating of working faces with particles of friction material. GB 950 544 and DE 197 20 139 C1 show a combination of surface profiling and coating.

SUMMARY OF THE INVENTION

The invention is based on the object of providing a tool of the generic type, in particular with a low brittleness and hard ribs, and a process for producing this tool.

Accordingly the invention provides for the working face of the tool to be irradiated with energy, the irradiation taking place in such a manner that recesses which have edge ribs thrown up are produced. The region close to the surface is melted, with a melt which solidifies to form ribs at the edge. The operation can be carried out without problems after a heat treatment, for example hardening of the blank. This blank is given an appropriate toughness in a suitable way during the heat treatment, so that the brittleness of the material is low. This tough core material is then preferably irradiated with a laser, with local surface hardening taking place only in the grooved zones and not in the intervening region. The melt is self-quenching. In association with the hardening of the material, the three-dimensional structure and in particular the topography of the surface also changes. In particular, channel-like recesses with edge ribs are formed. These channels of relatively hard material are embedded in a surrounding area of softer material. The ribs which are produced have a high resistance to abrasion and on the other side can penetrate elastically into the core material when a pressure in the direction of the surface normal is exerted on them. Furthermore, the process according to the invention has the advantage that the geometry of the recesses can be selected in virtually any desired way. It is preferable to produce edge ribs which are extra-hard. When one is screwing using a screwing tool which has been profiled in this way, these ribs can press into the walls of the screw-engagement opening, so that the tool grips into the screw. This digging of the curved ribs into the screw head is particularly pronounced in the case of galvanized screws. The irradiation is preferably carried out using in particular a focused laser. This profiling is also suitable for filing.

Claim 1 provides for the working face of the tool to be irradiated with energy, the irradiation taking place in such a manner that recesses which have edge ribs thrown up are produced. The region close to the surface is melted, with a melt which solidifies to form ribs at the edge. The operation can be carried out without problems after a heat treatment, for example hardening of the blank. This blank is given an appropriate toughness in a suitable way during the heat treatment, so that the brittleness of the material is low. This tough core material is then preferably irradiated with a laser, with local surface hardening taking place only in the grooved zones and not in the intervening regions. The melt is self-quenching. In association with the hardening of the material, the three-dimensional structure and in particular the topography of the surface also changes. In particular, channel-like recesses with edge ribs are formed. These channels of relatively hard material are embedded in a surrounding area of softer material. The ribs which are produced have a high resistance to abrasion and on the other side can penetrate elastically into the core material when a pressure in the direction of the surface normal is exerted on them. Furthermore, the process according to the invention has the advantage that the geometry of the recesses can be selected in virtually any desired way. It is preferable to produce edge ribs which are extra-hard. When one is screwing using a screwing tool which has been profiled in this way, these ribs can press into the walls of the screw-engagement opening, so that the tool grips into the screw. This digging of the curved ribs into the screw head is particularly pronounced in the case of galvanized screws. The irradiation is preferably carried out using in particular a focused laser. This profiling is also suitable for filing.

However, it is also conceivable to widen the laser beam and for it to pass over the area of the workpiece engagement surface. In this case, the metallic surface is heated to beyond the melting point and cools suddenly on account of the high temperature gradient. The surface is roughened as an associated effect of the melting and evaporation of the metal. The sudden freezing of the morphology formed through the high application of energy also leads to hardening of the surface. The hardness of the ribs/recess structure applied by laser irradiation is greater than the hardness of the material of the surrounding region, and consequently these structures are supported elastically.

The laser may be applied directly to the steel base body of the tool. However, it is also conceivable for a metal coating to have been applied beforehand, for example by electrodeposition. The profiling process may also take place in two stages. By way of example, the entire surface may first be roughened by application to the entire area. Then, a focused laser beam can be used to apply a linear structure. The first step can also be omitted. The application of the linear structures using a focused laser beam is associated with the formation of channels which are delimited by embankment-like edges. These embankment-like edges project above the surface of the workpiece engagement surface and form a hard and rough workpiece engagement profile. It has been found that, particularly if a metal coating is applied by electrodeposition to the surface regions exposed to the laser, the metal coating is made more compact. It has proven advantageous to use nickel as the metal coating. It is particularly advantageous if particles of hard material, in particular diamond chips, are embedded in the nickel layer. The application of the laser also causes these diamond chips to be held more securely in the metal matrix. The application of the laser takes place with an intensity and duration which are such that the profiled zones produced in this way are set back slightly with respect to the unprofiled workpiece engagement surface surrounding them. The beam direction of the laser which generates the profiling may be directed perpendicular to the surface. However, an acute-angled orientation is also possible. This ensures that the edge flanks of the set-back zones run out at an acute angle into the workpiece engagement surface. The focus of the laser beam is moved over the surface with a writing action. At the focus, the steel base material or the nickel-phosphorus coating which has been applied to the steel base material melts in regions. A material transformation occurs. The partially melted steel material forms a hardened microstructure. The partially melted nickel-phosphorus layer may be joined to the steel base body by fusion. This type of profiling is particularly advantageous for the working faces of screwdriver bits with a cross profile. The profile lines may run obliquely in the direction of rotation, thus counteracting the cam-out effect. The tool as it were digs into the screw opening. Furthermore, the shape of the channels prevents them from being filled with abraded material. They act as chip flutes.

In the application according to the invention of high-energy, in particular focused beams, the surface of the tool is partially melted briefly in the region of the focus of the beam. The partial melting may be effected by light, i.e. a laser beam, or by electron beams or by sputtering. The partial melting of the surface, which is only local and virtually spontaneous, leads to very high temperature gradients in the material. The consequence of this is that the melt, after the supply of energy has been removed, i.e. for example as a result of the laser beam moving onward, solidifies immediately. The dynamic forces acting during the melting cause the formation of a flow within the melt toward the edge of the latter. As a result, waves running toward the edge are formed. The process should be guided in such a way that, although the waves acquire flanks which are as steep as possible, they do not break. Therefore, the application of energy must end abruptly when the waves adopt their optimum flank shape. When the only brief supply of energy ends, the melt solidifies immediately. As a result, the solidified melt acquires a high hardness. This hardness may be greater than 62 HRC. It may be between 64 and 66 HRC. Below the well-like structure, which has a thickness of approximately 50 $\mu$m, the bulk material is tempered as a result of the application of heat. The material softens there. The well of harder material is therefore embedded in a soft zone. The hardness of this soft zone increases until it reaches the hardness of the base material.

BRIEF DESCRIPTION OF THE DRAWINGS

Exemplary embodiments of the invention are explained below with reference to appended drawings, in which.

DETAILED DESCRIPTION OF THE PREFERRED EMBODIMENT

Figure 1:
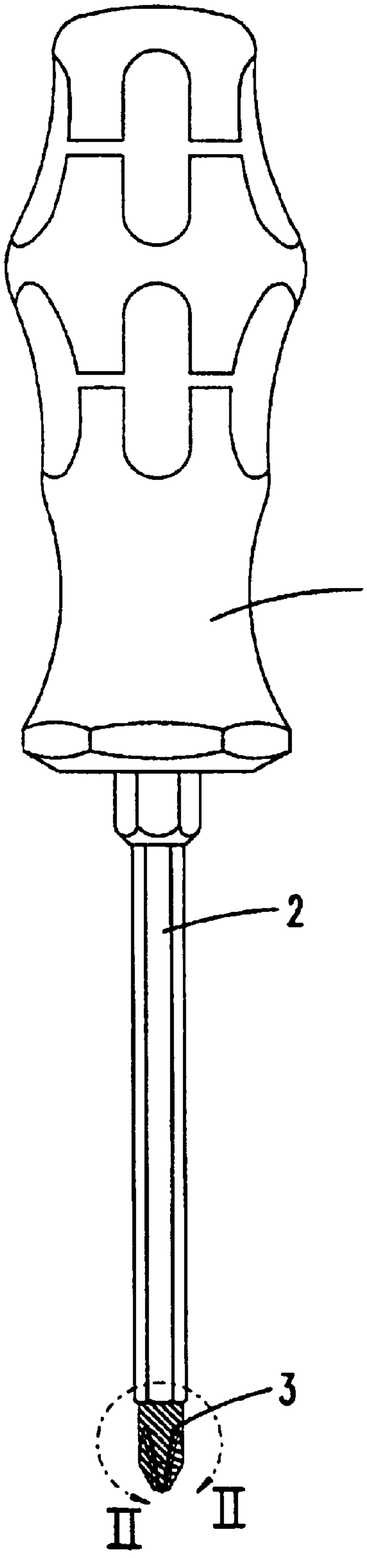
FIG. 1 shows a screwdriver with laser-profiled working tip.
Figure 2:
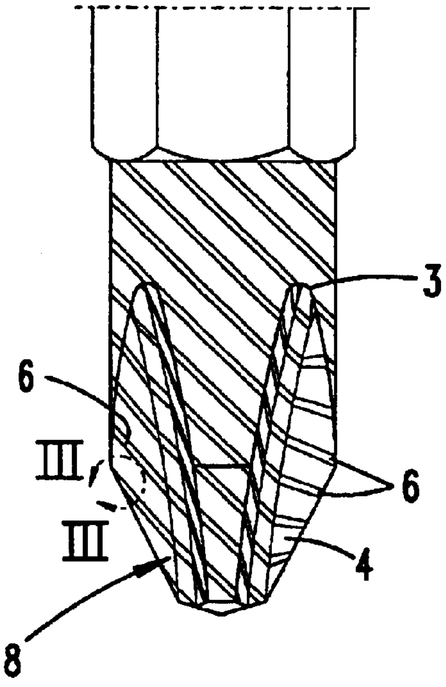
FIG. 2 shows the working tip.

The exemplary embodiment illustrated in FIGS. 1 and 2 is a screwdriver having a handle 3 and a blade 2. At its end, the blade 2 has a working tip 3. This working tip 3 forms a workpiece engagement surface 8. In the exemplary embodiment, the latter is in the form of a cross profile. Multiple, parallel passage of a laser beam over this workpiece engagement surface 8 produces a multiplicity of linear profile strips 6 running parallel to one another. The action of the metal coating 5 which has been applied to the steel core 4 strengthens the material. This strengthening of the material in the region of the material engagement profile 6 is associated with an increase in surface hardness of approximately 100%. The zone 6 to which energy is applied yields back slightly with respect to the zone surrounding it to which energy is not applied. The application of the laser beam results in the formation of a melt which follows the path of the laser beam. On account of the very high temperature gradient with respect to the bulk material, the melt is cooled very rapidly. The solidified channel then has a considerably greater hardness than the material surrounding the channel. The focused laser beam is preferably guided and oriented in such a way that the melt rises up in the manner of an embankment at its edges, in order in this way to produce annealed edge ribs. The material for this wave originates from the recess lying between the waves. The edge ribs are preferably formed by thermodynamically indexed flow movement in the melt, in such a manner that the material flows away from the center of the melt toward the edge, in order to solidify there.

Figure 3:
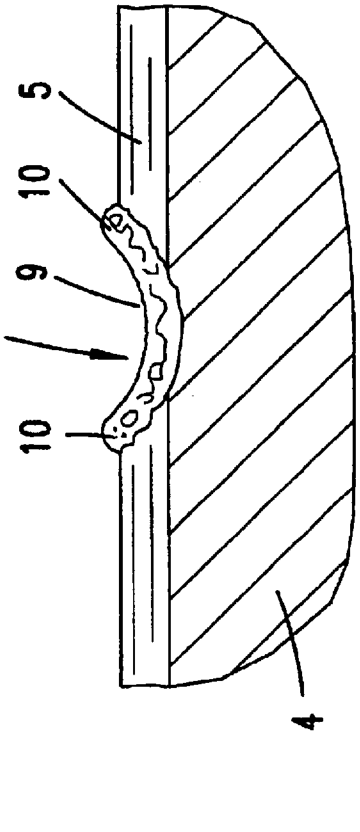
FIG. 3 shows an excerpt of the workpiece engagement surface.

The energy is applied using a focused laser beam. The laser beam source used may be a writing laser, in particular a diode laser, which is operated with a high power output. In the exemplary embodiment illustrated in FIG. 3, the steel core 4 bears a metal coating 5, which may be nickel phosphide. The laser beam which is guided with a writing action over the surface effects local, partial melting not only of the layer 5 but also of the adjoining zone of the steel base body 4. Then, the melt is suddenly solidified. In the process, an elongate crater is formed in the shape of a channel 9 with two embankment-like edges 10 which project above the surface of the metal coating 5. This leads to roughening of the surface, the material which has partially melted and suddenly cooled having a higher hardness. This material is structureless martensite.

Figure 4:
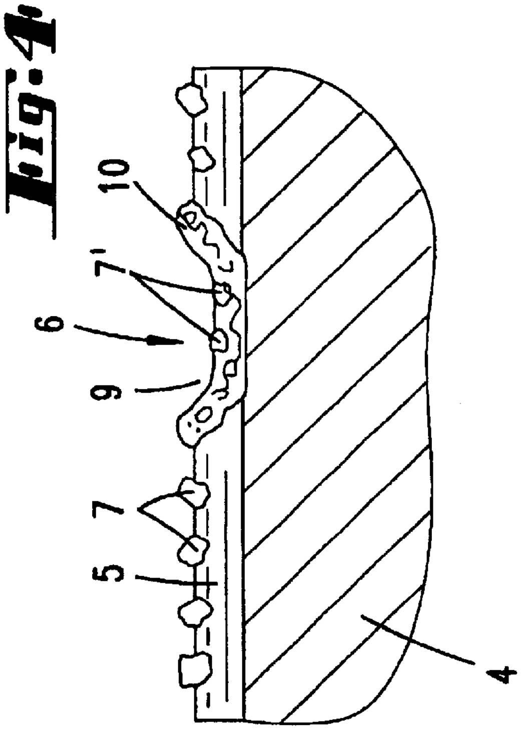
FIG. 4 shows an illustration corresponding to that shown in FIG. 3 for a second exemplary embodiment.

In the exemplary embodiment illustrated in FIG. 4, diamond chips 7 are additionally introduced into the nickel coating 5 and in regions project above the surface of the coating. The local heating by means of focused laser beam here too forms a linear profile strip 6. This profile strip 6 forms a channel 9 with edge-side waves 10 which project above the surface. During the local application of energy, not only is the metallic material partially melted, but also it is evaporated. The diamond chips to which energy is applied in the process in regions undergo a phase transformation. They may be oxidized at the edge in such a manner that they acquire a rounded structure. The diamond chips 7' which lie in the region of the profile strip 6 then no longer project above the surface.

Figure 5:
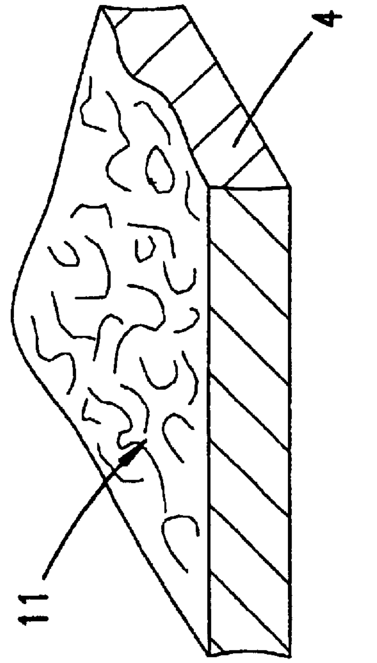
FIG. 5 shows a third exemplary embodiment of the invention, in a perspective, detailed illustration of a roughened surface.

In the exemplary embodiment illustrated in FIG. 5, the steel core 4 is uncoated. Its area was exposed, for example, to a diode laser. The surface region 11 was partially melted as a result of this exposure. The bubbles which are formed in the process are frozen in place by sudden solidification, resulting in roughening.

Figure 6:
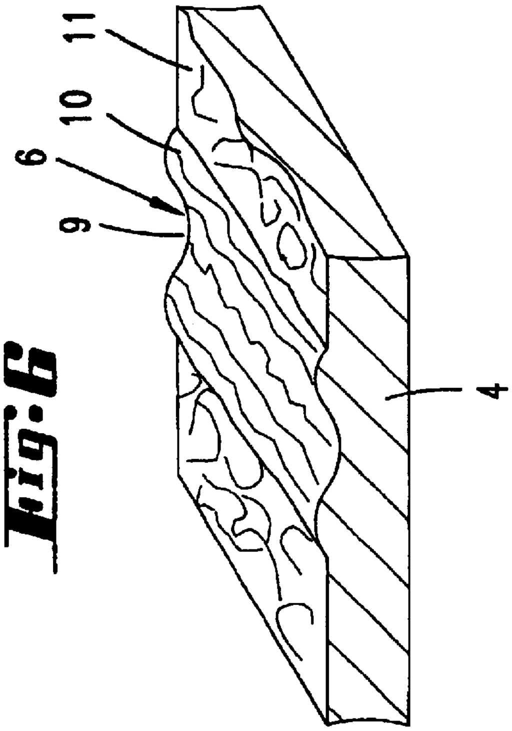
FIG. 6 shows an illustration corresponding to that shown in FIG. 5 after profiling.

In the exemplary embodiment illustrated in FIG. 6, a steel core surface 11, which has been pretreated in accordance with FIG. 5, has been treated by the writing action of a focused laser beam. In the process, linear structures were applied to the surface. The surface material of the steel body 4 was in regions partially melted and displaced toward the edge, so that embankment-like structures 10, which project above the surface 11, are formed on both sides of the channel 9.

As can be seen in particular from FIGS. 1 and 2, the preferred application area is the working tip of a screwdriver. The linear structures are preferably applied obliquely. The engagement surfaces of the screwing tip then dig into the screw head. This counteracts the cam-out effect. The channels do not tend to become blocked with metal which has been abraded from the screw head. They act in a similar manner to a chip flute.

It is considered particularly advantageous for local roughening to be associated with the local hardening of the surface.

Before the treatment of the working tip, the entire blade can be chrome-plated. The chromium is removed again from the working tip, completely or in regions, by the laser-beam treatment, so that the working tip also has color which distinguishes it from the remainder of the blade.

The shape of the grooves, the direction of the grooves and the arrangement of the grooves can be matched to the force-output profile of the screwing tool. For example, the grooves may form a diamond shape. They may run in fishbone fashion. However, they may also run transversely or parallel to the direction of extent of the blades. Conversely to when surface structures are stamped, there are scarcely any limits imposed on the shape and profile of the grooves, since there are no demolding problems.

The slight projection of the embankment-like edge of the groove with respect to the workpiece engagement surface also causes the screwing tool to stick in the screw opening, since there is a certain overdimensioning on account of this embankment. A screw which has been placed onto the screwing tool can be held there without the need for additional forces, such as for example, magnetic forces or the like.

Figure 7:
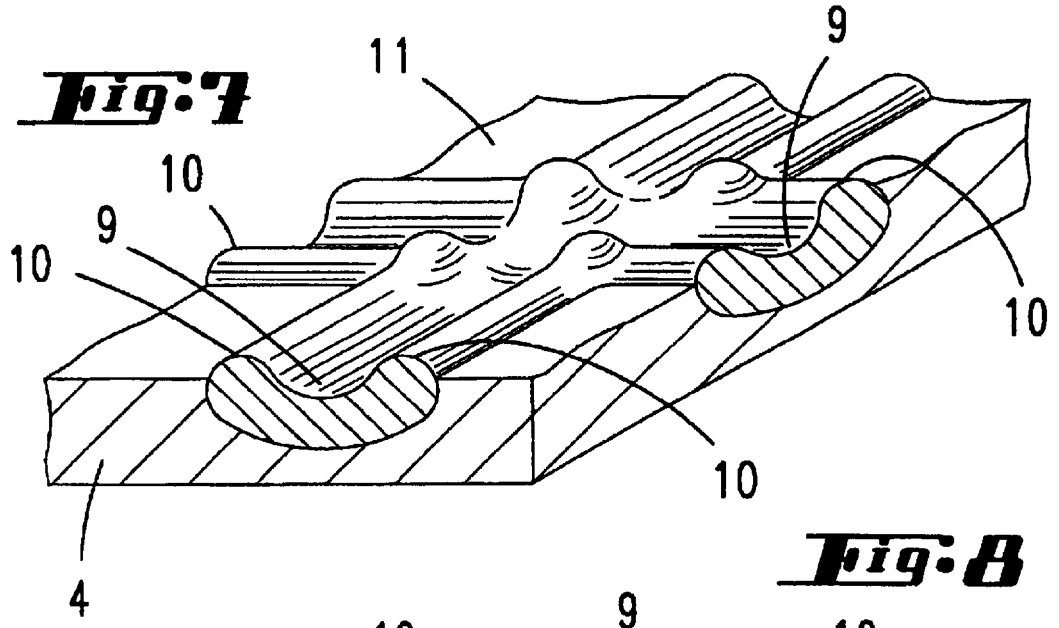
FIG. 7 shows an exemplary embodiment of the invention in which the working face forms well-like channels which cross one another.

FIG. 7 shows a further exemplary embodiment of the invention. In this case too, the recesses with edge ribs were applied by means of focused laser beam. However, in this case, the channel-shaped recesses cross one another, so that at the crossing point four elevations are formed in the region of the edge ribs.

Figure 8:
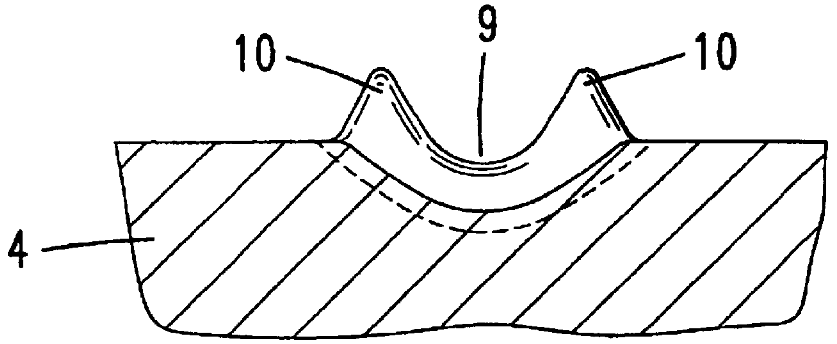
FIG. 8 shows a cross section through a well-shaped channel.

The flank profile is illustrated in FIG. 8. The flanks of the edge ribs are relatively steep. The edge ribs are formed as a result of waves which are developed when the energy is supplied. The waves solidify just before they break.

Figure 9:
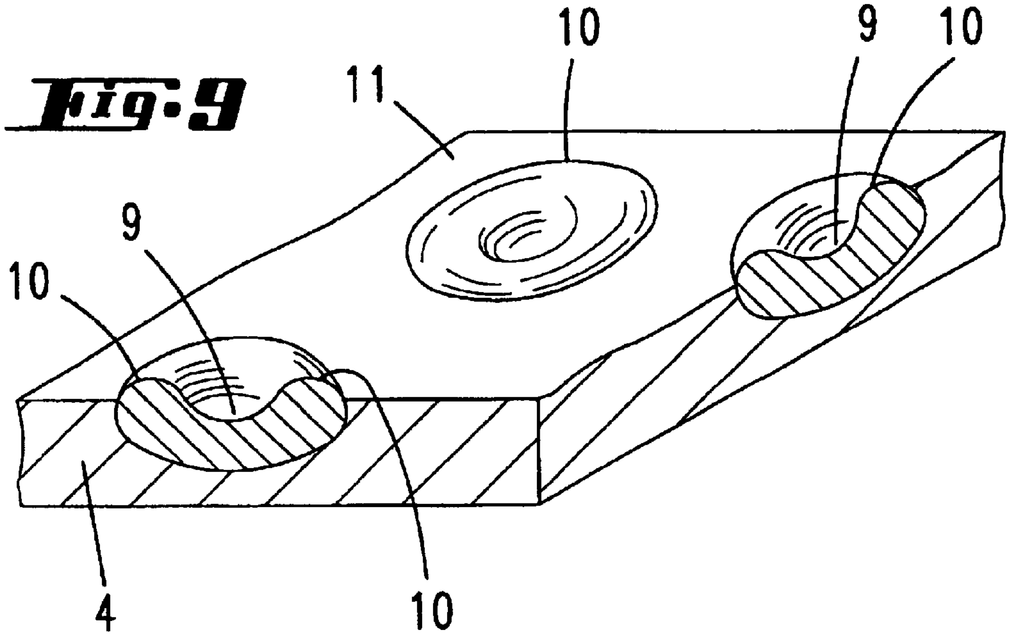
FIG. 9 shows a further exemplary embodiment of the invention, in which the recesses are in the shape of craters, FIG. 10 diagrammatically depicts a typical hardness curve of a 50 $\mu$m thick solidified melt and an adjoining 30 $\mu$m thick tempered zone.

In the exemplary embodiment shown in FIG. 9, the working surface is only exposed to a laser beam at certain points, so that ring-shaped edge ribs result.

Figure 10:
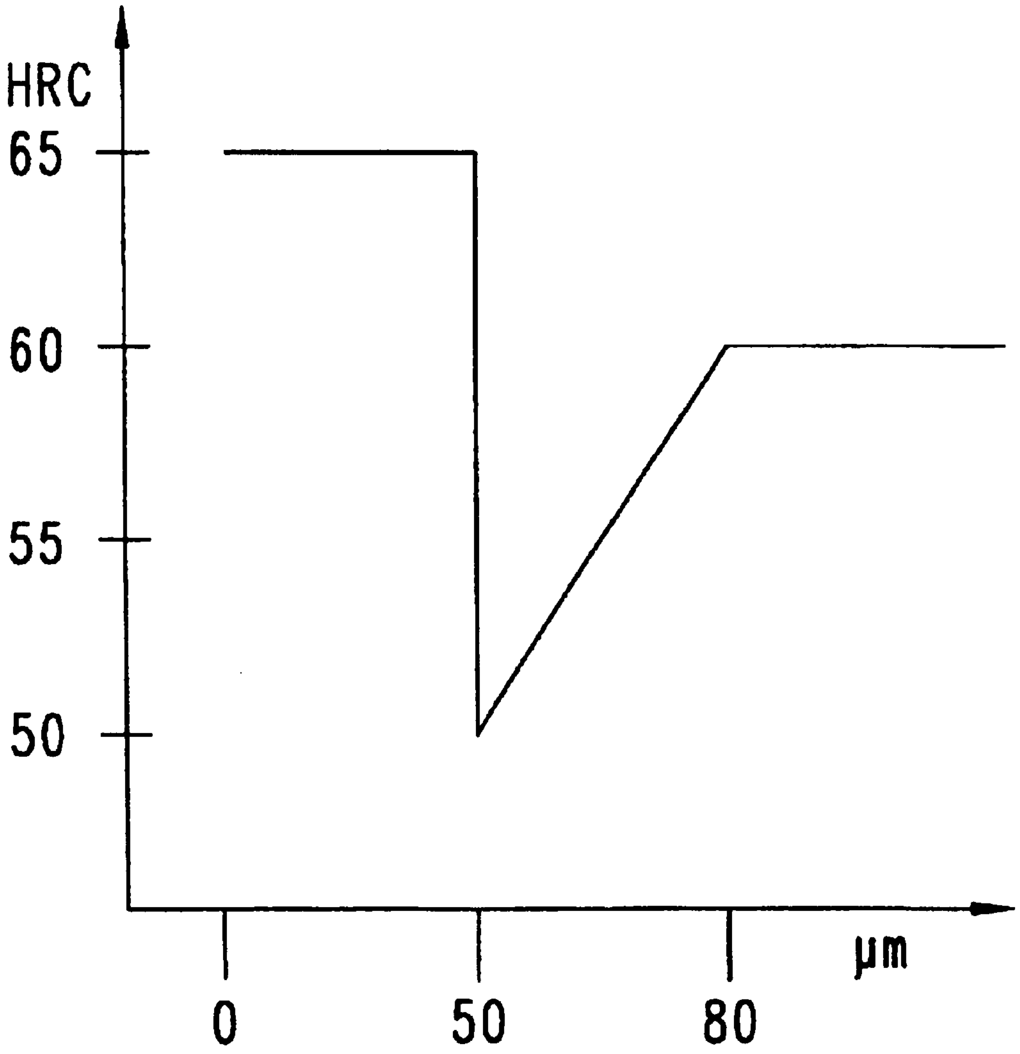

FIG. 10 shows a typical hardness curve. The hardness is given in Rockwell units. The range between zero and 50 $\mu$m (well) has a substantially constant hardness. This range corresponds to the solidified melt. The hardness here is typically 65 HRC. The range between 50 and 80 $\mu$m is the tempered zone below the solidified melt. The adjoining bulk material in the exemplary embodiment has a hardness of 60 HRC. On account of the tempering, the hardness in the tempered zone rises from approximately 50 HRC to 60 HRC.

Figure 11:
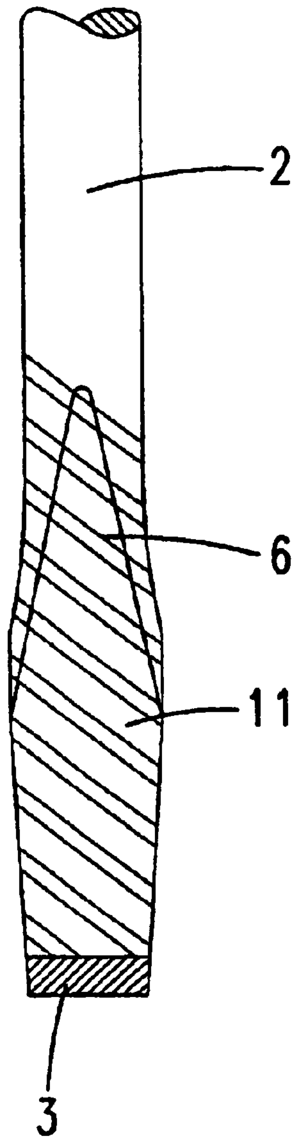
FIG. 11 shows a further exemplary embodiment of the invention, in which the tool is a screwdriver with a flat blade.

The exemplary embodiment illustrated in FIG. 11 is a screwdriver with a flat tip. In the region behind the flat tip 3, a flat zone 15 is formed, which is provided with profile strips 6. This flat zone 15 can be used for material-removing machining. This configuration means that one tool can be used for screwing and filing.

Figure 12:
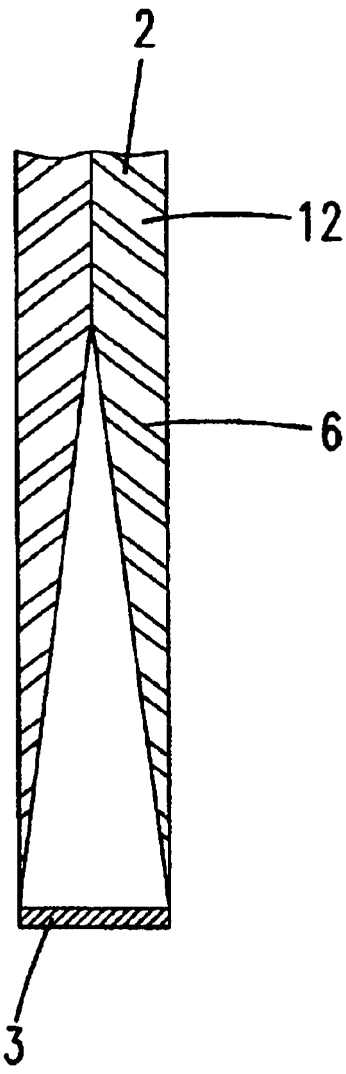
FIG. 12 shows a further exemplary embodiment of the invention, in which the screwing tool is likewise a screwdriver, but in this case the blade is polygonal and the polygon faces are laser-beam-profiled.

Similar machining is possible with the exemplary embodiment illustrated in FIG. 12. In this case, the blade has an angular, in particular square cross-sectional contour. In this case too, the polygon faces 12 are provided with profile strips which run parallel and are oriented obliquely with respect to the direction of extent of the blade. They form a ribbed structure, so that these flat faces can act as files. The tip 3 is profiled with ribs in this region.

Figure 13:
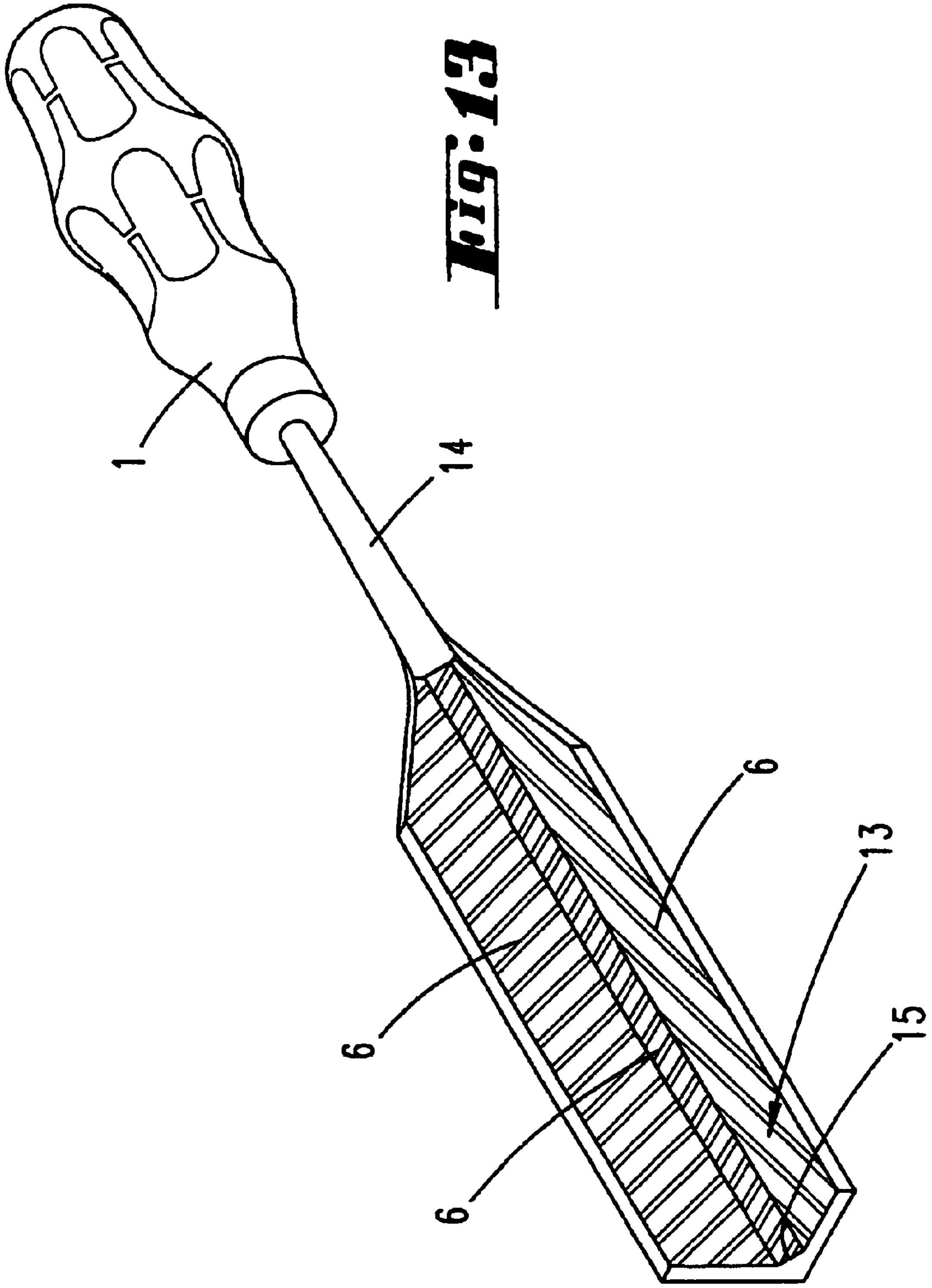
FIG. 13 shows an exemplary embodiment in which the tool is a file.

The exemplary embodiment illustrated in FIG. 13 is a file. The file blade is profiled in the manner described above. The particular feature of the tool illustrated in this figure is that the file blade is L-shaped. The planar cavity faces are covered with profile strips 6. In addition, at the apex there is a narrow face 15, which has likewise acquired chip-removing ribbing 6 through laser irradiation. With this tool, it is possible to carry out deburring in one operation. The blade is connected to a shank 14 having a handle.

Figure 14:
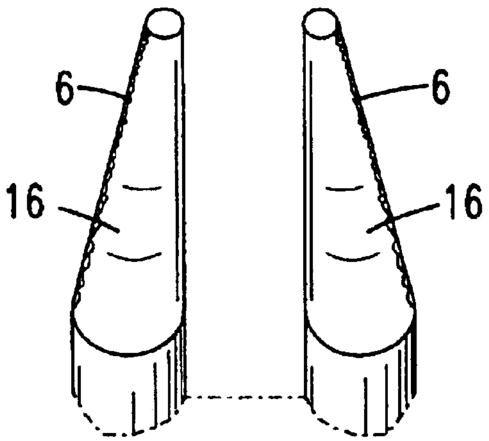
FIG. 14 shows the working tips of sawtooth ring pliers.

The exemplary embodiment illustrated in FIG. 14 shows the tips 16 of sawtooth ring pliers. The two working tips of the pliers run conically. In this case, parallel to the cone axis, profiling 6 is applied in particular to the side which faces outward, preventing the working tips from being able to slide out of the openings of the sawtooth ring.

Figure 15:
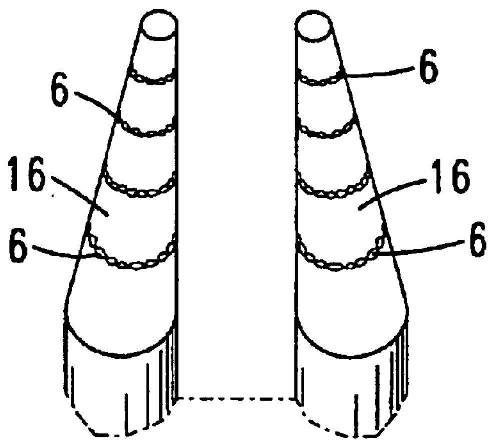
FIG. 15 shows modified forms of working tips of sawtooth ring pliers, and FIG. 16 diagrammatically depicts a jaw, which has been recess-profiled in accordance with the invention, for example of pliers, a clamping tool or a wrench.

FIG. 15 shows a modification. In this case, the profiled areas 6 are formed as encircling rings at an axial distance from one another.

Figure 16:
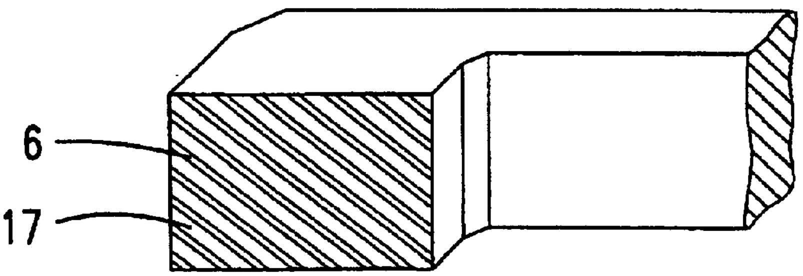

FIG. 16 shows a jaw 17 which has been profiled in accordance with the invention. This jaw may be associated with pliers. The pliers may have two jaws which face one another and are each profiled with profile lines which cross one another. However, the jaw may also be associated with a clamp clip. The jaw opening of a wrench may also have the same structure.

In particular, it is provided for a jaw of this type to be provided on an adjustable screwing tool, for example on a monkey wrench.

What is claimed is:

1. A process for profiling a workpiece engagement surface of a hand tool to attain a desired profile of said surface, comprising the steps of, briefly irradiating with a laser or an electron beam a portion of said workpiece engagement surface with a high level of energy, melting a region of an irradiated zone close to said workpiece engagement surface by said irradiation, and solidifying said region suddenly at an edge to form a rib in said profile, and wherein, prior to said irradiating step, there is a step of hardening said tool, and the irradiating step employs irradiation by a laser beam.

2. The process according to claim 1, wherein the laser beam is oriented at an acute angle onto the workpiece engagement surface.

3. The process according to claim 1, wherein said engagement surface is a metal surface, and the energy of the laser beam upon a focusing of the beam, is selected to be such that a passing of said beam over said engagement metal surface produces channels of structureless martensite as a result of a brief partial melting and/or evaporation of metal from said engagement surface at said edge, and wherein the channels at the edge of said engagement surface project above adjacent, untreated parts of said engagement surface in the manner of an embankment.

4. The process according to claim 1, further comprising a step of applying diamonds to a steel base body of said hand tool, and wherein the diamonds are partially rounded during application of the laser beam.

5. The process according to claim 3, wherein laser power and pass velocity of the laser beam are matched to one another such that waves are formed in a melt in said engagement surface and move toward said edge, upon exposure to the energy of said laser beam, solidify instantaneously just before a breaking of said waves.

6. A process for profiling a workpiece engagement surface of a hand tool to attain a desired profile of said surface, comprising the steps of: briefly irradiating with a laser or an electron beam a portion of said workpiece engagement surface with a high level of energy, melting a region of an irradiated zone close to said workpiece engagement surface by said irradiation, and solidifying said region suddenly at an edge to form a rib in said profile and, wherein the workpiece engagement surface (8) is chrome-plated before said irradiation.

* * * * *